US011570845B2

(12) United States Patent
Sanghavi

(10) Patent No.: US 11,570,845 B2
(45) Date of Patent: Jan. 31, 2023

(54) SYNCHRONOUS SECONDARY EMERGENCY RESPONSE SYSTEM

(71) Applicant: Nivedita Lakshmi Mehul Sanghavi, San Jose, CA (US)

(72) Inventor: Nivedita Lakshmi Mehul Sanghavi, San Jose, CA (US)

( * ) Notice: Subject to any disclaimer, the term of this patent is extended or adjusted under 35 U.S.C. 154(b) by 213 days.

(21) Appl. No.: 17/087,696

(22) Filed: Nov. 3, 2020

(65) Prior Publication Data

US 2022/0141917 A1    May 5, 2022

(51) Int. Cl.
*H04W 76/40* (2018.01)
*H04M 3/51* (2006.01)

(52) U.S. Cl.
CPC ......... *H04W 76/40* (2018.02); *H04M 3/5116* (2013.01)

(58) Field of Classification Search
CPC ............... H04W 76/40; H04M 3/5116; H04H 2201/30; H04N 7/173; H04N 7/17309; H04N 7/17318; H04N 2007/17381
See application file for complete search history.

(56) References Cited

U.S. PATENT DOCUMENTS

| | | | | |
|---|---|---|---|---|
| 10,348,888 | B1* | 7/2019 | Arnold | H04M 3/42042 |
| 10,609,541 | B1* | 3/2020 | Govindassamy | H04M 1/72418 |
| 2017/0169699 | A1* | 6/2017 | Will | H04W 4/90 |
| 2019/0037075 | A1* | 1/2019 | Nimbavikar | H04M 3/5116 |
| 2019/0222993 | A1* | 7/2019 | Maheshwari | H04W 4/023 |
| 2020/0077250 | A1* | 3/2020 | Gideon, III | G06Q 30/0205 |

OTHER PUBLICATIONS

Maltezos, Evangelos, et al. "Public safety in smart cities under the edge computing concept." 2021 IEEE International Mediterranean Conference on Communications and Networking (MeditCom). IEEE, 2021. (Year: 2021).*
Sigioltzakis, Eleftherios, and Ilias Politis. "On the performance of SIP-based next generation emergency services." 2018 IEEE 23rd International Workshop on Computer Aided Modeling and Design of Communication Links and Networks (CAMAD). IEEE, 2018 (Year: 2018).*

* cited by examiner

*Primary Examiner* — Sharad Rampuria

(57) ABSTRACT

An emergency response system which can work alongside traditional public emergency response systems. The emergency response system of the present invention comprises a central computer system and client devices. In case of an emergency, when a registered user dials an emergency number, in addition to the call being received by a conventional emergency response systems, a separate parallel communication to the central computer system of the present invention gets triggered automatically. On receiving the emergency communication the computer system selects most suitable registered volunteer responders and an alert is sent to the selected registered volunteer responders. For the responders who accept the request for help, the computer system establishes a communication channel with the caller client device. This way, the emergency response system of the present invention enables participation of volunteers from the civil society in providing faster emergency response to fellow citizens.

16 Claims, 9 Drawing Sheets

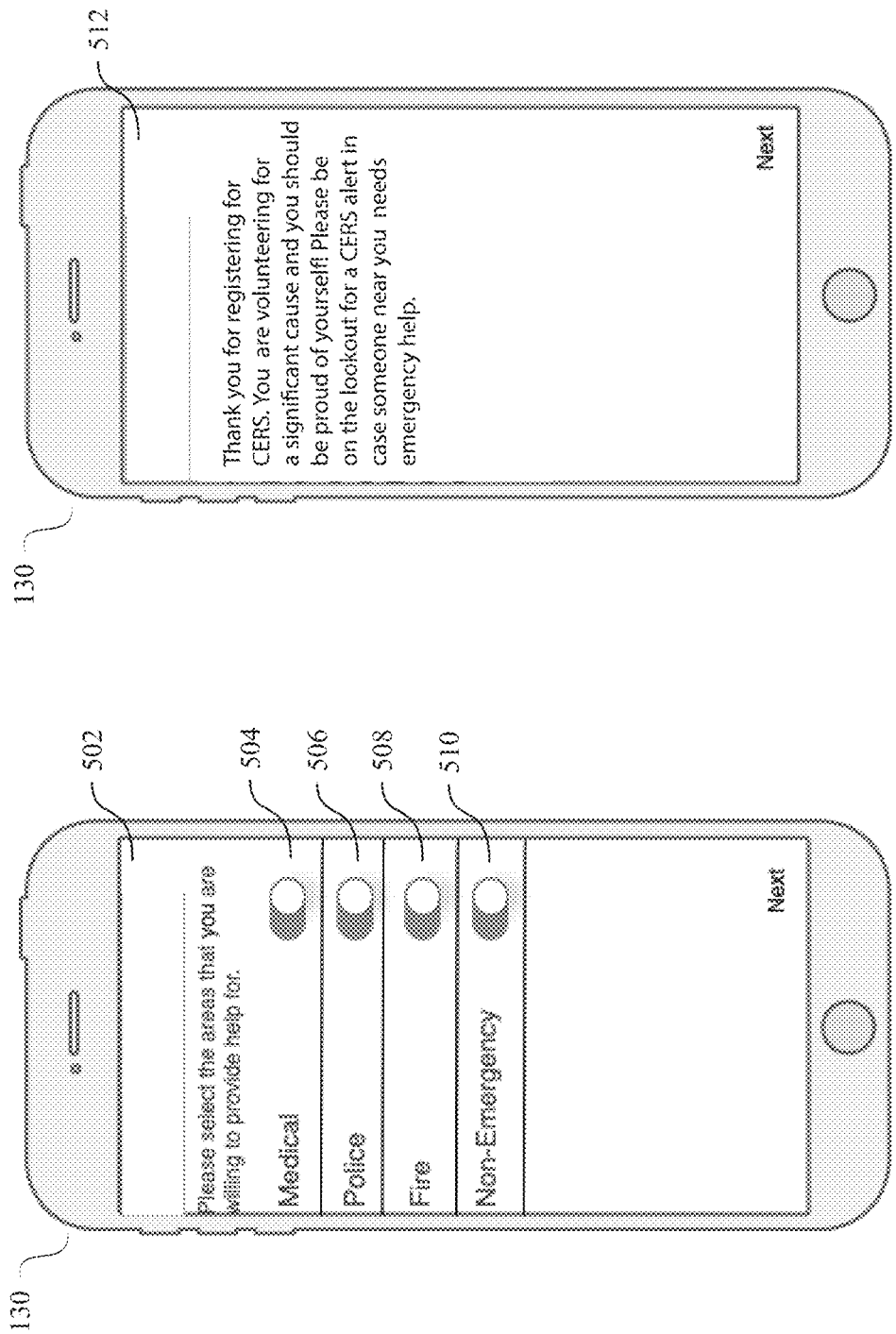

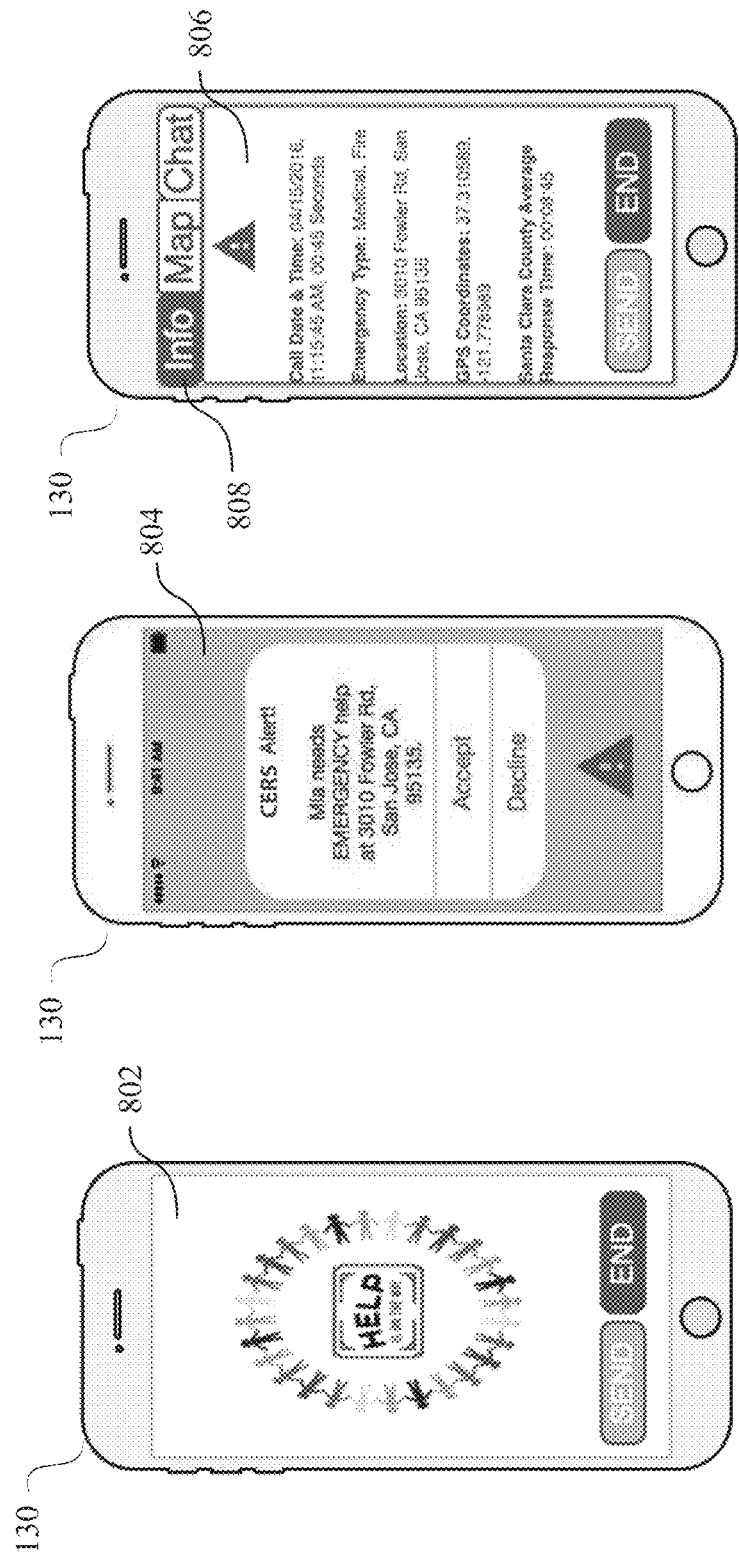

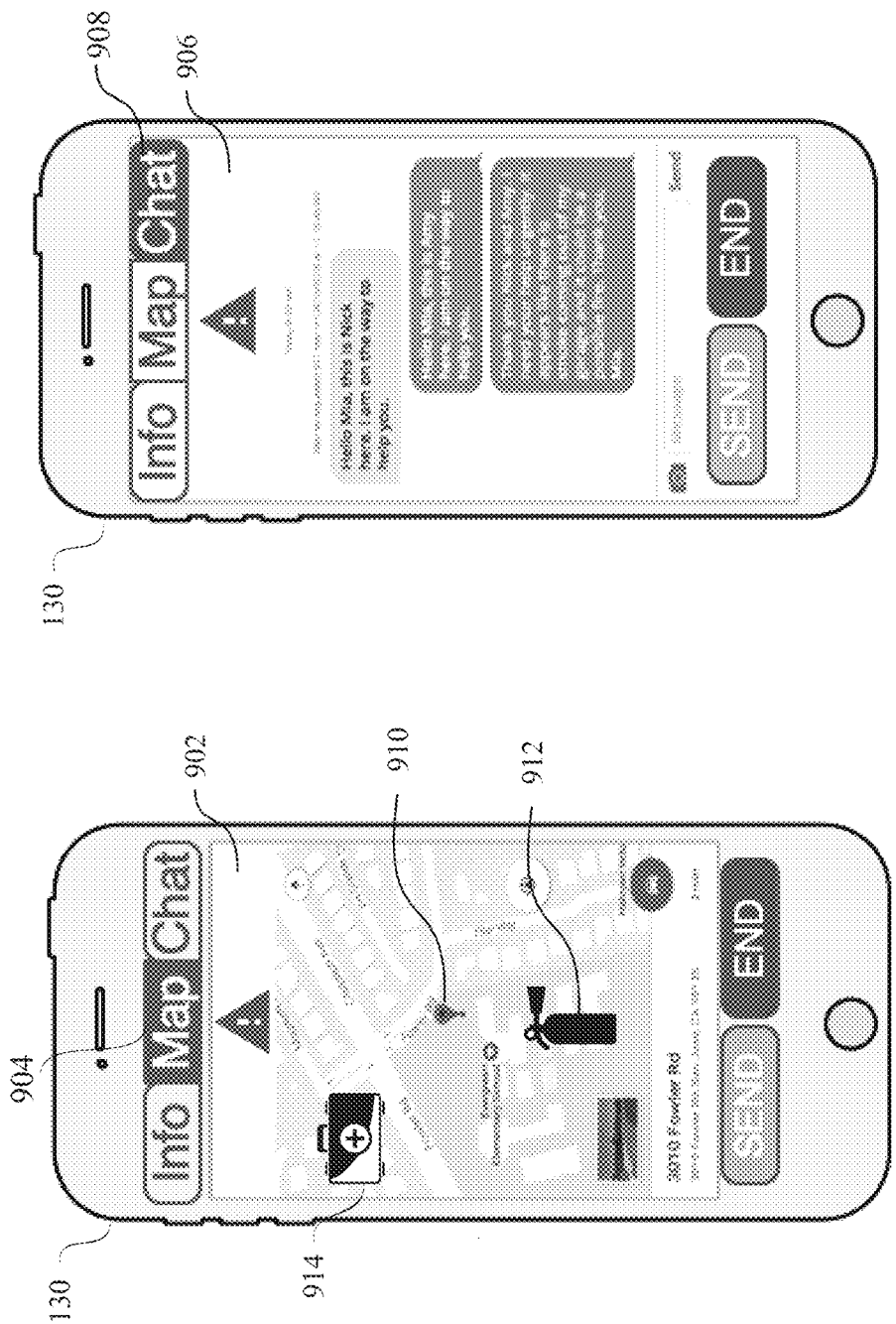

SYNCHRONOUS SECONDARY EMERGENCY RESPONSE SYSTEM

FIELD OF THE INVENTION

The present invention in general is related to emergency response. More particularly, the present invention is related to a system and method for providing response to emergency situations by willing community members.

BACKGROUND OF THE INVENTION

Emergency response includes any systematic response to an unexpected or dangerous emergency situation. Responders to the scene of an emergency range from police and fire to emergency health personnel. Many countries provide a designated emergency number for people in emergencies to seek help from. For example, users across the United States can invoke emergency response services by dialing 911 on their phones. The 911 calls are routed by the phone service providers to the nearest 'Public Safety Answering Point' (PSAP), The PSAP is a service which collects the information from the distress call and in turn alerts the proper emergency responders/agencies such as the police, fire department or emergency medical services (EMS).

In emergency situations, response time is of the essence for potential victims. Response time refers to how long it takes emergency responders to arrive at the scene of an emergency after the emergency response system has been activated, A long response time can result in increased and permanent damage, a higher likelihood of fatalities, and greater distress to those involved. For example, the optimal window for medical intervention in a cardiac arrest is often too narrow to allow for the timely arrival of trained medical professionals from EMS to the scene of a medical emergency.

In recent times the emergency systems and services have come under tremendous pressure due to reasons such as higher volume of emergency calls coupled with growth of overall population, declining funding from cash-strapped local counties and states, and higher budgets needed to modernize legacy PSAP and emergency call systems. In the United States, an estimated 240 million calls are made to 911 each year. In many areas, 70% or more calls are originated from wireless devices. This mind boggling volume of calls stretches the emergency systems to the brink that ultimately pushes up the time it takes to respond to incoming requests.

Thus, there exists a need for a system and method that overcomes the above-mentioned disadvantages associated with overburdened emergency response system.

OBJECTS OF THE INVENTION

It is, therefore, an object of the present invention to provide a system and method for reducing the burden on conventional emergency response system.

Another object of the present invention is to provide a system and method for collaborating with conventional emergency response system.

Another object of the present invention is to provide a system and method for faster emergency response.

Another object of the present invention is to provide a system and method for augmenting conventional emergency response system.

Another object of the present invention is to provide a system and method for community-based emergency response system.

Another object of the present invention is to provide a system and method for interactive emergency response system.

Another object of the present invention is to provide a system and method for emergency response even in absence of telecommunication network.

Details of the foregoing objects and of the invention, as well as additional objects, features and advantages of the invention will become apparent to those skilled in the art upon consideration of the following detailed description of the preferred embodiments exemplifying the best mode of carrying out the invention as presently perceived.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to an emergency response system which can work alongside traditional public emergency response systems such as PSAPs. The emergency response system of the present invention comprises a central computer system and client devices. In case of an emergency, when a registered user dials an emergency number such as 911, in addition to the call being received by a conventional PSAP, a separate synchronous parallel communication to the central computer system of the present invention gets triggered automatically. Option is provided to the caller to add information related to the emergency through the user interface presented on the client device of the caller. On receiving the emergency communication the computer system selects one or more registered volunteer responders on the basis of selection criteria such as type of emergency, distance, traffic condition etc. An alert is then sent to the selected registered volunteer responders. The responders, after getting the alert on the user interface provided by the present invention on their client devices, can accept or decline the request for help sought by the caller. For the responders who accept the request for help, the computer system establishes a communication network/channel with the caller client device. During the entire period in which the responders reach out to the emergency help seeker, a communication session among all the parties involved in the process is maintained by the computer system. Both the caller and the responder can add and modify information during the communication session. This way the emergency response system of the present invention enables participation of volunteers from the civil society in providing faster emergency response to fellow citizens.

To the accomplishment of the foregoing and related ends, certain illustrative aspects of the disclosed invention are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

In order to describe the manner in which features and other aspects of the present disclosure can be obtained, a more particular description of certain subject matter will be rendered by reference to specific embodiments that are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which:

FIGS. 5A-5B illustrate non-limiting exemplary screenshots of the user interface provided by the present invention for selection of type of emergency response options and for showing completion of registration message in accordance with an embodiment of the present invention;

FIGS. 8A-8B illustrate a non-limiting exemplary screenshot of the user interface showing communication related to the emergency call being sent to the community emergency response system and then to a responder in accordance with an embodiment of the present invention;

FIG. 8C illustrates a non-limiting exemplary screenshot of the user interface showing basic call information in accordance with an embodiment of the present invention; and FIGS. 9A-9B illustrate a non-limiting exemplary screenshot of the user interface showing navigational information and interaction between caller and responder in accordance with an embodiment of the present invention.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints including compliance with statutory and regulatory requirements, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
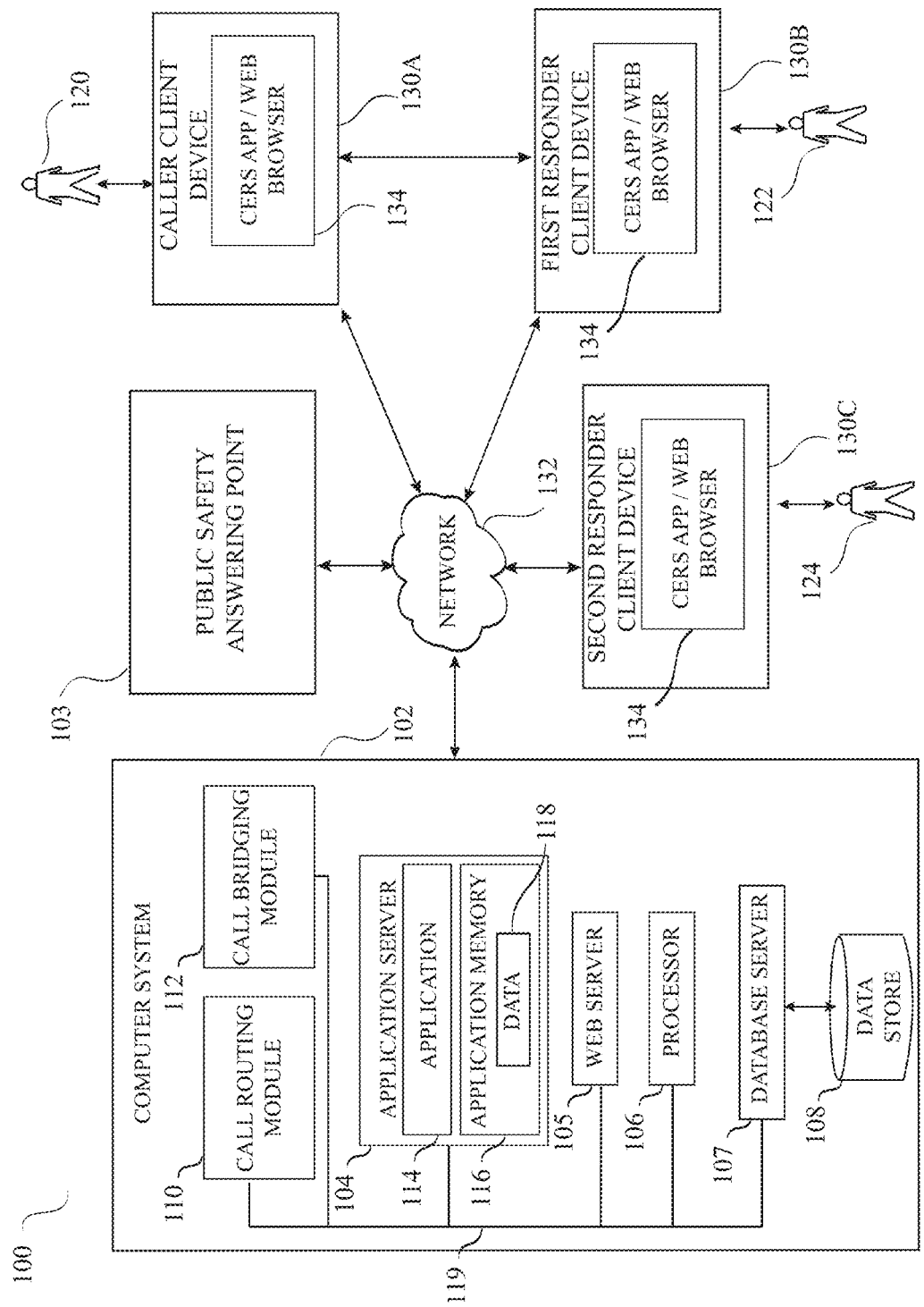
FIG. 1 illustrates a general architecture of a community emergency response system that operates in accordance with an embodiment of the present invention.

FIG. 1 illustrates the general architecture of a Community Emergency Response System (CERS) 100 that operates in accordance with one embodiment of the present invention. Three numbers of computing devices or client devices 130A, 130B and 130C are shown connected to a computer system 102 via a network 132. Although, only three computing devices or client devices are illustrated in FIG. 1, it is to be understood that there can be a plurality of client devices connected to the computer system 102. The computer system 102 communicates with the client devices over the network 132 to present a user interface for the community emergency response system of the present invention. The user interface of the community emergency response system of the present invention can be presented on the client device through a web browser or through a native mobile application communicating with the computer system 102 and is used for displaying, entering and/or managing data and for interacting with the system. As used herein, the term "network" generally refers to any collection of distinct networks working together to appear as a single network to a user. The term also refers to the so-called world wide "network of networks" or Internet which is connected to each other using the Internet protocol (IP) and other similar protocols. As described herein, the exemplary public network 132 of FIG. 1 is for descriptive purposes only and it may be wired or wireless. Although, the description may refer to terms commonly used in describing particular public networks such as the Internet, the description and concepts equally apply to other public and private computer networks, including systems having architectures dissimilar to that shown in FIG. 1. The inventive idea of the present invention is applicable for all existing cellular/telecommunication network topologies or respective communication standards, in particular GSM, UMTS/HSPA, LTE and future standards. Although, in FIG. 1, the client devices (130A, 130B and 130C) and the computer system 102 are shown connected with the public safety answering point 103 through a common network 132, the components can use separate communication networks also.

The graphical user interface (GUI) or user interface provided by the community emergency response system 100 on the client devices through a web browser or mobile app may be utilized by the users for signing up, logging in, submitting preferences, selecting types of emergency, receiving/making audio/video communication, getting real time updates and alerts etc.

The components appearing in the community emergency response system 100 refer to an exemplary combination of those components that would need to be assembled to create the infrastructure in order to provide the tools and services contemplated by the present invention.

The computer system 102, as shown in FIG. 1, includes an application server or executing unit 104, a web server 105, a processor 106, a database server 107, a data store 108, a call routing module 110 and a call bridging module 112. The application server 104 supports operation of at least one service. Physically, the application server 104 may be an independent device residing outside the computer system 102, or integrated in the computer system 102 as shown in FIG. 1, which is not limited by this embodiment in any manner.

The computer system 102 performs a portion or all of the processing steps of community emergency response system described herein in response to the processor 106 executing one or more sequences of one or more instructions contained in the application memory 116 included in the system. Computer system 102 may include one computer or multiple computers with different software components operating on different computers. The application server 104 includes an application 114 including executable application code for performing the functions of the application. Application 114 may store data 118 in application memory 116. Application memory 116 may include internal tables, for example, or other data structures for maintaining and manipulating data used by application 114. Application memory 116 may store data corresponding to simple or complex data structures. One or more processors 106 in a multi-processing arrangement may also be employed to execute the sequences of instructions contained in memory. The term "computer readable medium" as used herein refers to any medium that participates in providing instructions to the processors for execution. A computer readable medium may take many forms, including but not limited to, non-volatile media, volatile media, and transmission media. Non-volatile media includes, for example, optical, magnetic disks, and magneto-optical disks, such as the hard disk or the removable media drive.

The Web server 105 is a system that sends out Web pages containing electronic data files in response to Hypertext Transfer Protocol (HTTP) requests or similar protocol requests from remote browsers (i.e. browsers installed in the client devices) or in response to similar requests made through a mobile app or mobile application of the present invention installed on a client device. The web server 105 can communicate with the mobile app of the present invention and/or with a web browser installed on client devices 130A-130C to provide the user interface required for the community emergency response.

As shown in FIG. 1, application server 104 may communicate with the database server 107 over communication channel 119. Database server 107 includes data store 108. Data store 108 may be an in-memory database, for example and/or may include database persistent storage which may be a hard disk drive, for example. The above configuration of application server 104, web server 105 and database server 107 are illustrative only, and it is to be understood that features and embodiments of the present invention may be implemented in other configurations.

Reference to FIG. 1, call routing module 110 is configured to manage call routing by placing incoming calls in proper queue and then routing the call to a specific responder or group of responders based on pre-established rules and criteria. Call routing occurs before someone on the receiving end picks up the call. The call bridging module 112 is configured to establish a communication channel between a caller and a responder who accepts the request for help from the caller.

Although, the description of the community emergency response system 100 may refer to terms commonly used in describing particular computer servers, the description and concepts equally apply to other processing systems, including systems having architectures dissimilar to that shown in FIG. 1.

Figure 3:
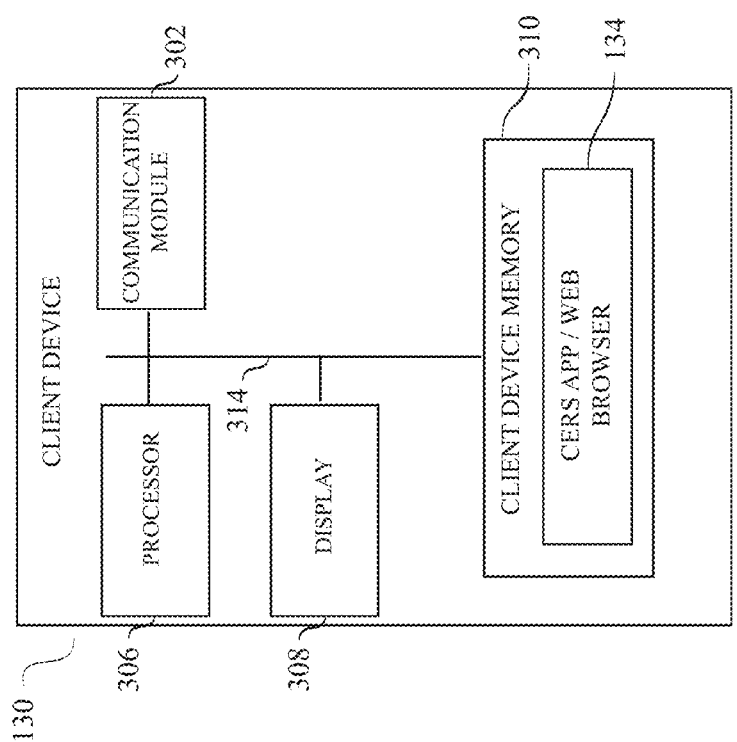
FIG. 3 illustrates a general architecture of a client device that operates in accordance with an embodiment of the present invention.

FIG. 3 illustrates a client device 130 suitable for use with the various embodiments. The general architecture of the client device 130 depicted in FIG. 3 is same for all client devices used in the present invention including for caller client device 130A, first responder client device 130B and second responder client device 130C. The components described with respect to the client device 130 enables communication with the computer system 102, with public safety answering point 103 and with/among other client devices. As shown in FIG. 3, client device 130 may comprise a communication module 302, a processor 306, a display 308 and a client device memory 310. The memory 310 may include a non-transitory storage medium such as a disk drive, a flash drive, a solid state memory device, a memory circuitry, or some other memory device, in various forms of volatile and non-volatile memory storage, and may store processor-executable instructions, such as an operating system, computer programs, firmware, mobile application of the present invention or some other form of processor-executable instructions, which may include an operating system, utilities, drivers, network interfaces, applications, or some other type of software. The display 308 may display information, and may present the user interface of the present invention to receive input and display information. The communication module 302 may include various elements to enable the client device 130 to communicate with another device and/or with a communication network (such as the communication network 132 of FIG. 1) including interfaces, transceivers, and other hardware and/or related software. The processor 306 may control the operation of the display 308, the communication module 302, and the client device memory 310, over a communication link 314 such as a bus or other communication link. The client device memory 310 may store a browser application and/or a mobile app 134. The browser application and/or the mobile app 134 may enable the client device 130 to communicate with a web server (e.g., the web server 105 of FIG. 1).

The mobile application or "mobile app" is a computer program that may be downloaded and installed on client devices using methods known in the art. It can also be a set of instructions programmed on the hardware of the client device or a pre-loaded computer program or firmware or any such native application supplied with the client device. Hereinafter, the mobile app/native application of the present invention and/or the user interface of the invention presented through a web browser by the community emergency response system 100 are referred to as CERS app. The CERS app enables one or more users to access various features related to the community emergency response system of the present invention. Examples of client device 130 may include, but not limited to mobile devices, tablets, hand-held or laptop devices, smartphones, personal digital assistants, desktop computer or any similar computing devices.

Also shown in FIG. 1 is a public safety answering point (PSAP) 103. A PSAP is used by emergency services to answer calls from the public to notify emergency personnel, such as police or firemen, to respond to an emergency situation. Traditionally, a caller would contact a PSAP and provide location information during the telephone call. The term PSAP is used herein to refer to any public/private emergency response service which functions in the same or similar way the conventional PSAP does. In a preferred embodiment, the computer system 102 is configured to collaborate with the PSAP 103 for community emergency response. In the present invention, a call, such as a 911 call, made from a client device 130 to the PSAP 103 triggers a communication to the computer system 102 also. This triggering action can be made possible in many ways. For example, the computer system 102, with the help of the CERS app 134 installed on a client device 130, can configure the client device 130 to trigger the communication whenever an emergency call (such as 911 or similar calls) is made from the device. Again, by collaborating with the network provider (e.g. telecommunication network provider for the network 132), the computer system 102 may make the network to trigger the communication to the computer system 102 simultaneously whenever a client device 130 connected to the network makes an emergency call. Similarly, with the PSAP's consent, the computer system 102 can configure the PSAP 103 to send a communication to the computer system 102 whenever the PSAP 103 receives an emergency call. In the latter two cases, the computer system 102 checks its data store against the incoming communication to identify as to whether the caller is registered with the community emergency response system of the present invention or not. Instant action is initiated by the computer system 102 for registered callers whereas, for unregistered callers, the system may ask for some basic information from the caller to initiate action for emergency assistance. The communication triggered by the emergency call can be a telephonic call and/or an electronic message.

An embodiment of the present invention will be described by way of a non-limitative example and with reference to the accompanying drawings. The community emergency response system 100 of the present invention will be described herein in the context of a person seeking emergency help.

Figure 2:
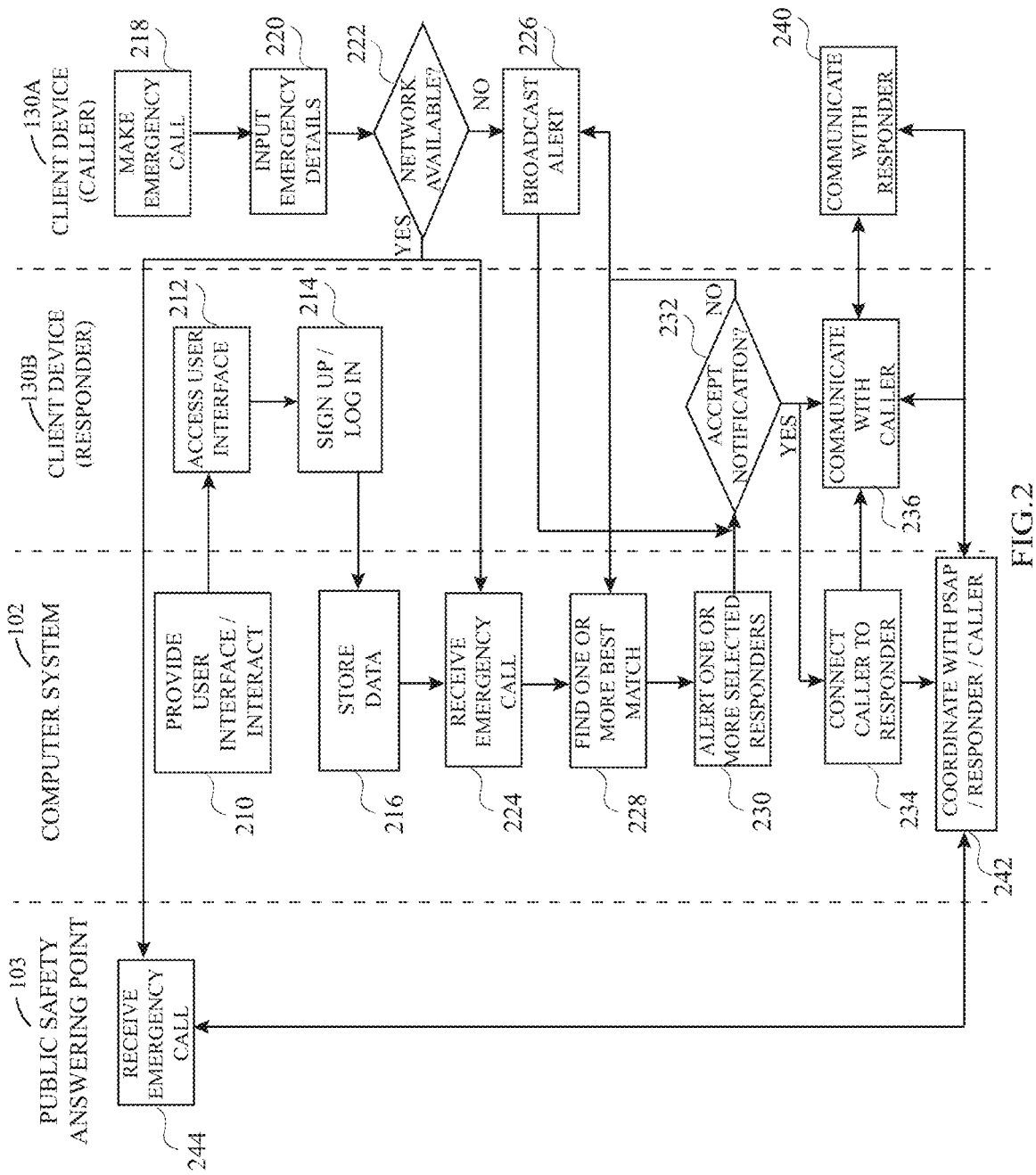
FIG. 2 illustrates a flowchart depicting the general steps associated with the method for community emergency response system in accordance with an embodiment of the present invention.

The computer system 102 communicates with the client devices over the network 132 to present a user interface for the present invention as in step 210 of FIG. 2. Users (for example, 120, 122, 124 who are individuals) can access the user interface provided through a web browser or through the CERS app 134 installed on the client devices 130A-130C as in step 212. User interface allows a user to logon to the system through one or more options. Apart from logging into the system as registered user, a user may be allowed to access the system as a guest user also.

Figures 4A, 4B:
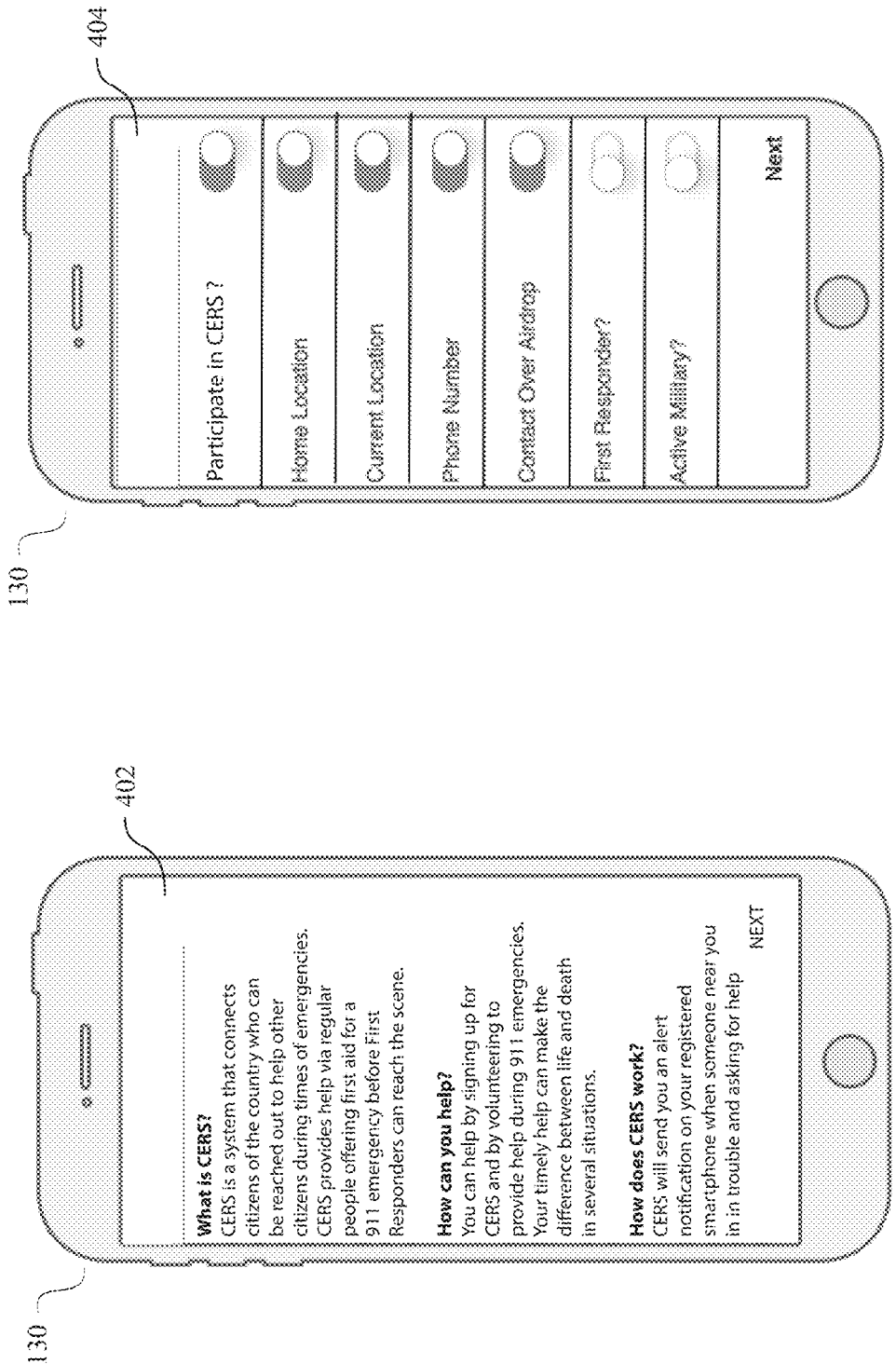
FIGS. 4A-4B illustrate non-limiting exemplary screenshots of Graphical User Interface (GUI) or user interface provided by the present invention showing introductory information and user consent options in connection with logon/signup in accordance with an embodiment of the present invention.

As shown in FIG. 4A, the initial screen 402 may provide a brief introduction of the community emergency response system to the user. The user interface 404, as shown in FIG. 4B, will ask the new users to enter some basic personal information for registration as in step 214. The new users, registering as responders, will also be asked to enter their preferences related to the emergency response, as shown in FIG. 5A. For example, the users may be required to provide their preferences on the type of help they are willing to offer (button 504 for help in medical emergency, button 506 for help in law enforcement matters, button 508 for fire emergency and button 510 for non-emergency help). Users registering as volunteer responders may also be given the option of selecting preferred mode of receiving any alert for emergency help. A language selection option is also provided to the users for selecting one or more languages in which they may prefer to communicate. With these and some other steps the registration process for the community emergency response system ends as shown on user interface 512 of FIG. 5B. In a preferred embodiment, every registered user is assigned a unique identification. This unique identity may be linked to one or more information provided by the user (to telephone/mobile number of the user, for example). In another embodiment, one or more client devices may be associated with every registered user. For example, a mobile contact number of a registered user may be used to associate a smartphone of the user to the user identity. All such relevant user information is then stored in data store 108 as in step 216 of FIG. 2.

Figure 6B:
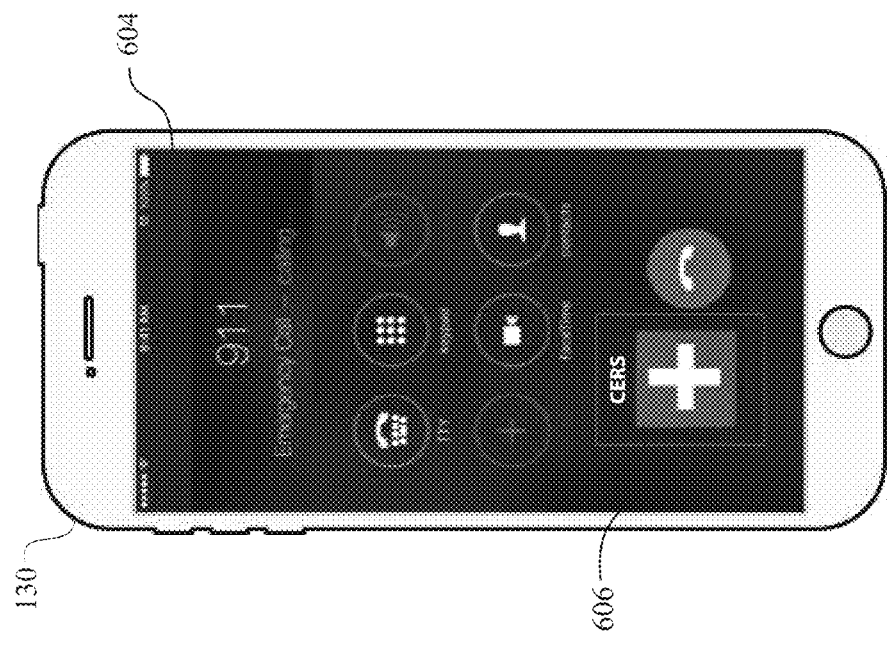
FIGS. 6A-6B illustrate a non-limiting exemplary screenshot of the user interface for emergency calling and for community emergency response call initiation in accordance with an embodiment of the present invention.
Figure 6A:
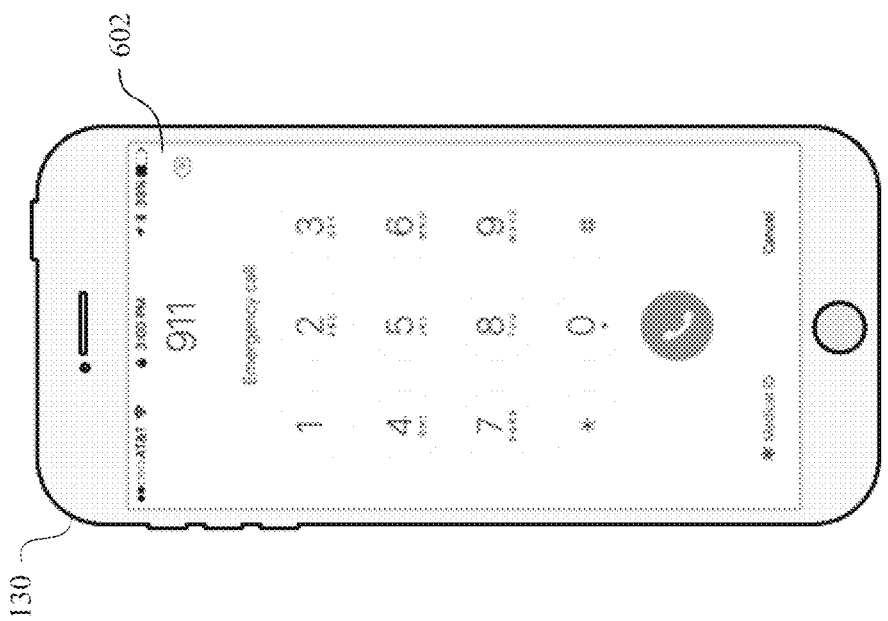
Figure 7B:
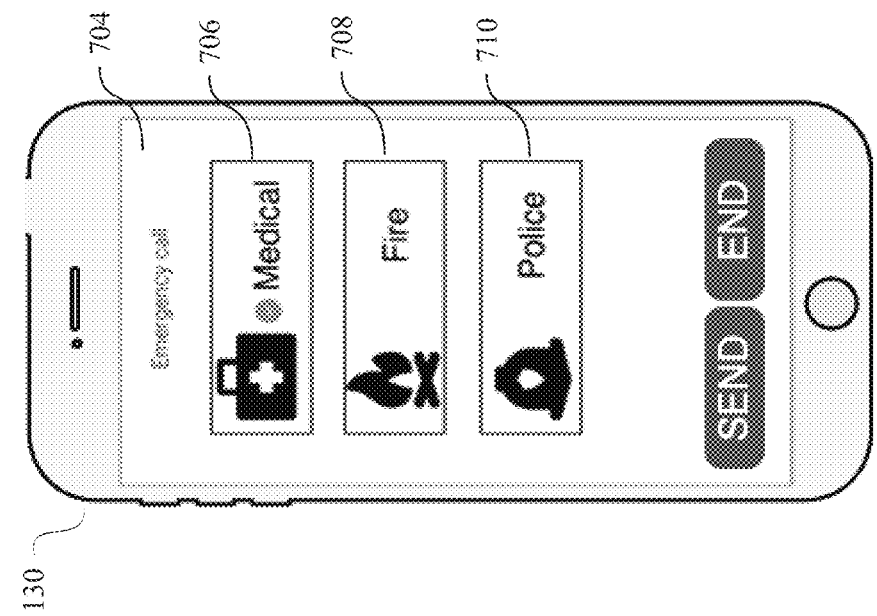
FIGS. 7A-7B illustrate a non-limiting exemplary screenshot of the user interface for providing additional emergency related information in accordance with an embodiment of the present invention.
Figure 7A:
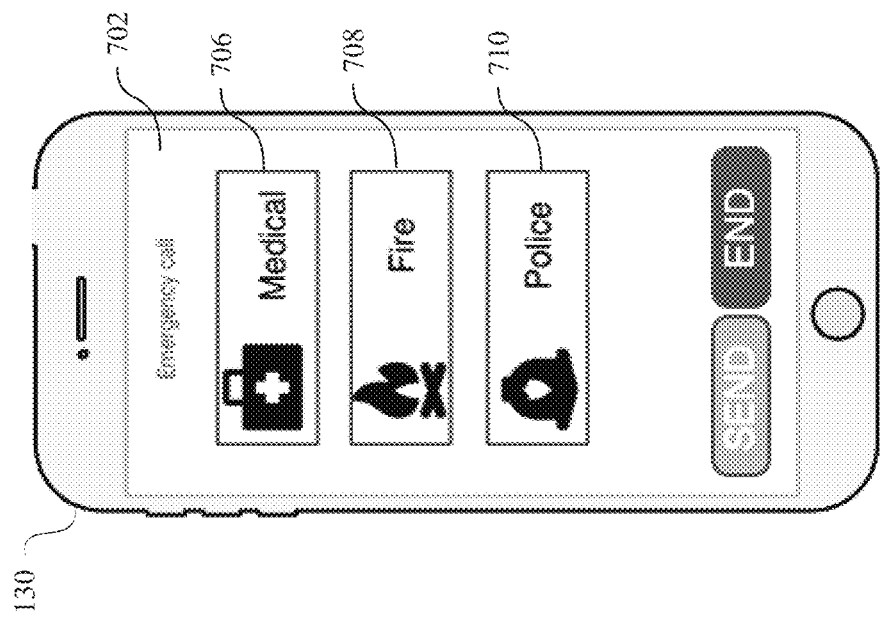

In the present example, the individual 120 is a registered user of the community emergency response system and is in urgent need of medical assistance. On the other hand, individuals 122 and 124 are registered with the community emergency response system as providers of medical help. The user 120 is referred to hereinafter as caller 120 and the client device 130 used by the caller 120 is referred to as caller client device 130A as shown in FIG. 1. When the caller 120 makes an emergency call, as in step 218, from the caller client device 130A, as is done generally from a client device by dialing an emergency number as shown on user interface 602 of FIG. 6A, apart from the call being directed to the PSAP 103, a communication is also sent to the computer system 102. While sending the communication to the computer system 102, the user interface of the present invention enables the caller to provide some additional information which may be useful for getting appropriate and quicker emergency assistance. For example, as shown on user interface 604 of FIG. 6B, a button 606 may be provided on the user interface at the caller client device for adding the additional emergency details as in step 220 of FIG. 2. On clicking/pressing/activating the button 606, the next user interface 702, as shown in FIG. 7A, presents the options for selecting type of emergency such as button 706 for medical, 708 for fire and 710 for police. In the present example, as shown on user interface 704 in FIG. 7B, the caller 120 selects button 706 since the user is calling for medical emergency help.

On checking as in step 222, if the network 132 is found available for the caller client device 130A while the emergency call is being made, the call goes to the PSAP 103 as in step 244 of FIG. 2 and, simultaneously, a communication (with the emergency details, as applicable), as shown on user interface 802 of FIG. 8A, goes to the computer system 102 as in step 224. In one embodiment, the PSAP 103 and the community emergency response system take actions independently and separately with respect to emergency response. In another embodiment, the PSAP 103 and the computer system 102 collaborate to provide emergency services.

On receiving the communication from a client device 130, the computer system 102 carries out a series of checks to identify the best matches for users registered as responders as in step 228 of FIG. 2. The checks can be carried out based on several criteria such as type of emergency (medical, fire etc.), caller location, registered responders' availability in a geo-fenced area/region, language preference and local traffic conditions etc. In the context of the present invention, the virtual perimeter defined by the geofencing also includes perimeter defined in three-dimensional Cartesian coordinate system (e.g. a geofenced high-rise residential building with perimeter defined in terms of spatial coordinates to include the entire building vertically also in the perimeter which makes the system first search for best matches from volunteering responders residing at different levels of the building). In a preferred embodiment, this matching operation is carried out on real time basis based on the information received from the caller client device and/or from the responder client devices (the client devices associated with the responder users of the system). For instance, a responder may be found to be located nearest to the location of the caller as per the home address of the responder recorded in the data store 108. But, at the time when the emergency call was made by the caller, this particular responder may be found to be travelling far away from his/her home address as per the location information received from the client device (mobile phone, for example) of the responder. In the present example, for caller 120, registered responder 122 with responder client device 130B and responder 124 with responder client device 130C are determined to be the best matches based on the above-mentioned criteria.

The call routing module 110 then sends an alert to the selected responders to notify about the emergency call as in step 230 of FIG. 2. An exemplary alert received on a responder client device is shown in FIG. 8B. The responders may accept or decline the call for emergency through the user interface 804. In the present example, responder 122 accepts the alert and, accordingly, responder 122 is hereinafter referred to as first responder 122. Responder 124 is referred to hereinafter as second responder 124. The computer system 102 may be configured to keep on finding next best matches for responders till the time a predetermined number of suitable responders accept the alert.

As soon as a responder accepts the alert in step 232, the call bridging module 112 shown in FIG. 1, establishes a communication channel between the caller client device and the one or more responder client devices to connect the caller to the willing responders as in step 234 of FIG. 2. This communication channel/bridge enables the computer system 102 to ensure better coordination among all the parties involved in the emergency response as in step 242. During the communication session that begins after the establishment of communication channel, the computer system 102 allows the caller 120 to add more details or modify the details about the type of the emergency and other relevant information about his/her surroundings. The responders and administrators/supervisors of the system are also allowed to send information to the concerned parties during the communication session. All parties involved in the communication session will be able to get the relevant information through the user interface. For example, the relevant information provided through the user interface may be categorized under different tabs on the user interface such as info tab 808 for caller details as shown on the user interface 806 of FIG. 8C, map tab 904 for caller and/or responder location information as shown on user interface 902 of FIG. 9A, and chat tab 908 for messaging between the caller and the responders as shown on user interface 906 of FIG. 9B. In the present example, both the first responder 122 and the second responder 124 chat with the caller 120 as shown on user interface 906 of FIG. 9B on their way to the caller's location for emergency help. In some embodiments, the client devices of the responder and the caller may be configured to automatically give audio/visual alerts as soon as the client device of the responder comes within a predefined area/distance/radius around the caller's client device. In another embodiment, the additional information provided by the computer system 102 to the responders and/or to the caller on the user interface includes information on availability and location of nearby emergency aid apparatus with respect to the location of the responder and/or the caller. Examples of emergency aid apparatus may include nearest fire extinguisher, an automated external defibrillator (AED), a first aid station or kit, foil blankets and more. Such additional information including the availability and the location of the emergency aid apparatus can be overlaid on top of the map displayed on the user interface (e.g. location of nearest fire extinguisher 912 and first aid kit 914 around caller location 910 shown in FIG. 9A).

In a preferred embodiment, apart from enabling communication between the client devices of the caller and the responders as in steps 236 and 240, the computer system 102 also coordinate with the PSAP 103, as in step 242 of FIG. 2, on real time basis in terms of information sharing, as required. Collaboration between the computer system 102 of the present invention and the PSAP 103 will preclude confusion, streamline the emergency response and optimize the resources. For instance, if the community emergency response system of the present invention succeeds in mobilizing the responders in quick time for a particular emergency situation, the PSAP 103 may save its resources for providing emergency services elsewhere.

The community emergency response system of the present invention also enables the client devices to broadcast, as in step 226 of FIG. 2, a communication related to an emergency call using the native radio frequency communication features of the client device in the event of non-availability of network 132 when the emergency call is made. Examples of radio frequency broadcasting may include use of protocols such as Wi-Fi and Bluetooth based broadcasting. On receiving such a communication, any nearby client device registered with the community emergency response system of the present invention will present on the user interface of the device options to accept or decline the alert for help the same way it is done at step 232 of FIG. 2. If the responder accepts the alert then the communication channel gets established between the caller and responder client devices and the communication session begins.

The present invention also enables a registered client device to transfer an ongoing emergency call to another registered client device located near the first client device if the first client device becomes inactive/inoperative or runs out of battery power during the call. The call transfer mechanism keeps an emergency call active without interruption and the transferred call on the nearest client device carries with it all of the same features which would have been there while calling from the first client device. If the nearest client device, with the transferred call on, goes beyond a predefined distance from the first client device, the call gets further transferred to the next available nearest client device. The nearest client device described here can be a client device belonging to a registered or unregistered user of the system of the present invention. In a preferred embodiment, the computer system 102 transfers a call to only such a nearest client device which is not moving at a speed beyond a predefined limit. This feature prevents the call from getting transferred to a nearby moving vehicle.

In times of area-wide crisis, more than one caller from the same neighborhood/area may initiate an emergency call. While each call will be routed and queued up for the local PSAP to answer, the computer system 102 of the present invention can tie these proximity based calls coming from neighboring caller client devices together for an area-wide distress signal. For example, when a fire breaks out in a building impacting multiple floors or if there is a shooting that impacts multiple people. These instances can trigger multiple emergency calls. The computer system 102 can then use a group distress call to initiate a wider signal which is no longer limited to a small geo-fence. It can use special privileges to activate a larger alert on social networking platforms. The intent of doing this goes beyond seeking help from non-emergency personnel to alerting a wider audience of an issue that may impact them. Depending on the setup, a group distress call can then cancel any summons to non-emergency personnel and instead can help expedite PSAP 103 to respond. In some instances, the responders engaged by the PSAP 103 may not be sufficient to deal with an emergency situation such as flash flood and earthquake etc. The PSAP 103 is configured to keep the parallel communication made to the computer system 102 active and seek cooperation from the volunteering responders registered with the system of the present invention to help the PSAP 103 engaged responders in such situations. The PSAP 103 is also configured to automatically trigger the communication to the computer system 102 when the wait time for an emergency call made to the PSAP 103 exceeds a predefined time period and/or when the PSAP 103 detects the caller or the caller client device to be situated at a predefined remote area/region where the PSAP 103 registered professional responders may need a long time to reach.

To increase the reach of the community emergency response system it can be syndicated via select services such as (1) taxi services, (2) delivery services, (3) courier/postal services etc. This may enable broadcasting of the emergency call to the nearby vehicles that are already mobile and may be able to help. In some embodiments, specific users (via services) may be prioritized over others. For example, courier/postal trucks may be able to carry with them fire extinguishers and they may be able to help in emergency calls for fire. Similarly, other services may be able to carry with them first aid kits (more than what a user would normally have at home) and they may be able to help in emergency calls for medical help.

A log of every responder who received the emergency/distress notification and of those who accepted the call for help is recorded in the data store 108. This information can be made available to the users, if required, for making the operation of the system transparent. The computer system 102 can also turn off the emergency call once enough numbers of users have accepted the call to help. For example, if a distress call is being answered by two users in an urban area, the computer system 102 may no longer accept additional calls for help from the same client device.

In another embodiment, the community emergency response system of the present invention is enabled, with a user's consent, to take full or partial control of home automation system of the user when needed. The term home automation system is used hereinafter to refer to system/device used at homes or at other premises to automate or remotely control various household functions. Examples of Internet of Things (IoT) based home automation devices may include smart home appliances and smart home safety and security devices etc. A user is given the option, at the time of signing up or at any other stage, to authorize the community emergency response system to access and take control of the user's home automation system when required. The user's home automation system details, including the access codes, are linked to the user's unique identifier maintained by the community emergency response system. This feature enables the responders to activate or de-activate one or more home automation devices installed at the caller's place to mitigate an emergency situation or to prevent worsening of an emergency situation. For example, community emergency response system may enable a responder to open the automatic door which is crucial in medical emergencies, activate air purifiers, alarms and external sprinkler systems in case of fire or turn off gas inlet to the home. So, when an emergency call is placed, CERS can take one or more rule-based actions with regard to the caller's home automation system depending on the type of help being requested.

The present invention can improve the conventional emergency response system in several ways. It can help save lives by reducing the amount of time it takes for a 911 caller to receive help. It can reduce the amount of time spent by professional First Responders on non-emergency calls by engaging volunteers from the communities in non-emergency calls. It can increase awareness of local emergencies to a wider audience and by building a community of users who care for each other in times of crisis. It helps is preserving First Responder resources at the state and the county level that can be diverted to better use. It can play its part by broadcasting an emergency call using built-in communication options of the devices such as Bluetooth and Wi-Fi technologies when the weather turns inclement causing phone and electric lines to go down. It will also be useful in vast parts of country where the population density is low and distances are vast—making it harder for emergency response services to reach the emergency scene in a short time. The present invention will also have a major social benefit—common citizens of the country coming to the aid of each other. This would prove to be invaluable as the system's usage catches on.

While the present invention is susceptible to various modifications and alternative user interfaces, a certain illustrated embodiment thereof is shown in the drawings and has been described above in detail. It should be understood, however, that there is no intention to limit the invention to the specific form or forms disclosed, but on the contrary, the intention is to cover all modifications, alternative user interfaces, similar features and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

The flowchart is used to describe the steps of the present invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowcharts may be included in performing this method. Accordingly, the specific arrangement of steps shown in FIG. 2 should not be construed as limiting the scope of the invention.

What is claimed is:

1. A computer-implemented method for community emergency response said method comprising:
    configuring, a caller client device, to automatically trigger a transmission of a communication over a network to a computer system when an emergency call made to a public safety answering point using said network by a caller from said caller client device is not answered within a predefined time period, and, to automatically trigger a broadcasting of said communication using a native radio frequency communication feature of said client device when said network that connects said caller client device to said public safety answering point is not available while making said emergency call;

receiving said communication by one or more responder client devices, said one or more responder client devices either being within a range of said broadcasting or being selected by said computer system based on one or more criteria in case of said transmission of said communication over said network;

establishing a communication channel between said caller client device and a first responder client device, said first responder client device being one of said one or more responder client devices on which said one or more responders accept said communication; and providing, through said communication channel, by said computer system, one or more information on a user interface presented on said caller client device and on said first responder client device during a communication session started after establishing said communication channel;

wherein said communication channel is established with a nearest client device automatically if said caller client device becomes inactive during said communication session, said nearest client device being a client device determined to be located nearest to said caller client device by said computer system during said communication session and is not moving at a speed beyond a predefined limit relative to said caller client device.

2. The method of claim 1, wherein said one or more criteria comprise suitability of said one or more responders based on declarations provided by said one or more responders, availability of said one or more responders in a geofenced region, a language preference, a traffic condition between a location of said one or more responder client devices and said caller client device, said one or more responders being associated with said one or more responder client devices.

3. The method of claim 1, wherein a plurality of responders are ranked by said computer system based on said one or more criteria to select said one or more responders.

4. The method of claim 1, wherein said user interface enables said caller to input additional caller information during said communication session.

5. The method of claim 1, wherein said one or more information presented on said user interface comprises real time update on a location of said first responder client device, direction to reach said caller client device and a chat bridge and information on availability and location of nearby one or more emergency aid apparatus.

6. The method of claim 1, wherein said computer system ties said communication received from said caller client device as a group call with said communication received from one or more neighboring caller client devices if said communication received from said one or more neighboring caller client device are received during said communication session, said one or more neighboring caller client devices being client devices determined to be located by said computer system within a specific distance from said caller client device.

7. The method of claim 1, wherein said caller client device and said first responder client device are configured to give an audio and/or visual alert when said first responder client device comes within a specific radius of said caller client device.

8. The method of claim 1, wherein said computer system and said first responder client device are configured to access and control a home automation system linked to said caller during said communication session.

9. A system for community emergency response, said system comprising:

a computer system comprising one or more physical processors programmed with computer program instructions that, when executed by said one or more physical processors, program said computer system to:

configure, a caller client device, to automatically trigger a transmission of a communication over a network to a computer system when an emergency call made to a public safety answering point using said network by a caller from said caller client device is not answered within a predefined time period, and, to automatically trigger a broadcasting of said communication using a native radio frequency communication feature of said client device when said network that connects said caller client device to said public safety answering point is not available while making said emergency call;

receive said communication by one or more responder client devices, said one or more responder client devices either being within a range of said broadcasting or being selected by said computer system based on one or more criteria in case of said transmission of said communication over said network;

establish a communication channel between said caller client device and a first responder client device, said first responder client device being one of said one or more responder client devices on which one or more responders accept said communication; and provide, through said communication channel, by said computer system, one or more information on a user interface presented on said caller client device and on said first responder client device during a communication session started after establishing said communication channel;

wherein said communication channel is established with a nearest client device automatically if said caller client device becomes inactive during said communication session, said nearest client device being a client device determined to be located nearest to said caller client device by said computer system during said communication session and is not moving at a speed beyond a predefined limit relative to said caller client device.

10. The system of claim 9, wherein said one or more criteria comprise suitability of said one or more responders based on declarations provided by said one or more responders, availability of said one or more responders in a geofenced region, a language preference and a traffic condition between a location of said one or more responder client devices and said caller client device, said one or more responders being associated with said one or more responder client devices.

11. The system of claim 9, wherein said a plurality of responders are ranked by said computer system based on said one or more criteria to select said one or more responders.

12. The system of claim 9, wherein said user interface enables said caller to input additional caller information during said communication session.

13. The system of claim 9, wherein said one or more information presented on said user interface comprises real time update on a location of said first responder client device, direction to reach said caller client device, a chat bridge and information on availability and location of nearby one or more emergency aid apparatus.

14. The system of claim 9, wherein said computer system ties said communication received from said caller client device as a group call with said communication received from one or more neighboring caller client devices if said communication received from said one or more neighboring caller client device are received during said communication session, said one or more neighboring caller client devices being client devices determined to be located by said computer system within a specific distance from said caller client device.

15. The system of claim 9, wherein said caller client device and said first responder client device are configured to give an audio and/or visual alert when said first responder client device comes within a specific radius of said caller client device.

16. The system of claim 9, wherein said computer system and said first responder client device are configured to access and control a home automation system linked to said caller during said communication session.

\* \* \* \* \*